US011442223B2

(12) United States Patent
Lindner et al.

(10) Patent No.: US 11,442,223 B2
(45) Date of Patent: Sep. 13, 2022

(54) DRAW TOWER GRATING PRODUCTION METHOD AND SYSTEM

(71) Applicants: FBGS TECHNOLOGIES GMBH, Jena (DE); FBGS INTERNATIONAL NV, Geel (BE)

(72) Inventors: Eric Lindner, Jena (DE); Johan Vlekken, Diepenbeek (BE); Christian Voigtländer, Jena (DE); Bram Van Hoe, Ghent (BE); Manfred Rothhardt, Jena (DE); Hartmut Bartelt, Jena (DE)

(73) Assignees: FBGS TECHNOLOGIES GMBH, Jena (DE); FBGS INTERNATIONAL NV, Geel (DE)

( * ) Notice: Subject to any disclaimer, the term of this patent is extended or adjusted under 35 U.S.C. 154(b) by 417 days.

(21) Appl. No.: 16/471,635

(22) PCT Filed: Dec. 18, 2017

(86) PCT No.: PCT/EP2017/083189
§ 371 (c)(1),
(2) Date: Jun. 20, 2019

(87) PCT Pub. No.: WO2018/114730
PCT Pub. Date: Jun. 28, 2018

(65) Prior Publication Data
US 2020/0088936 A1 Mar. 19, 2020

(30) Foreign Application Priority Data
Dec. 22, 2016 (EP) .................................. 16206162.6

(51) Int. Cl.
*C03C 25/6208* (2018.01)
*C03B 37/027* (2006.01)
(Continued)

(52) U.S. Cl.
CPC ...... *G02B 6/02133* (2013.01); *C03B 37/0253* (2013.01); *C03B 37/02718* (2013.01);
(Continued)

(58) Field of Classification Search
CPC ............ C03B 37/0253; C03B 2205/40; G02B 6/02133; G02B 2006/02157
See application file for complete search history.

(56) References Cited

U.S. PATENT DOCUMENTS

| 5,400,422 A | 3/1995 | Askins et al. |
| 5,513,004 A * | 4/1996 | Naqwi ................. G01B 11/105 356/485 |

(Continued)

OTHER PUBLICATIONS

Pissadakis "An elliptical Talbot interferometer for fiber Bragg grating fabrication" May 2005, Review of Scientific Instruments vol. 76 , 066101, pp. 1-3. (Year: 2005).*

(Continued)

*Primary Examiner* — John M Hoffmann
(74) *Attorney, Agent, or Firm* — Workman Nydegger

(57) ABSTRACT

A system for producing an optical fiber with inscribed grating array is described. The system comprises a fiber drawing apparatus for drawing an optical fiber, a writing system for inscribing a grating in the optical fiber during the drawing process of the optical fiber and a controller for controlling the driving of the writing system. According to the present invention the fiber drawing apparatus also comprises a fiber length and/or drawing detecting means for determining the fiber length and/or fiber drawing speed and/or a fiber drawing parameter during the drawing process. The controller thereby is configured for capturing information from the fiber length and/or drawing detecting means and for controlling the writing system based on the captured information captured from the fiber length and/or drawing detecting means.

18 Claims, 1 Drawing Sheet

(51) Int. Cl.
*G02B 6/02* (2006.01)
*C03B 37/025* (2006.01)

(52) U.S. Cl.
CPC ...... *C03C 25/6208* (2018.01); *C03B 2205/40* (2013.01); *C03B 2205/60* (2013.01); *G02B 2006/02157* (2013.01)

(56) References Cited

U.S. PATENT DOCUMENTS

| | | | | |
|---|---|---|---|---|
| 2005/0008293 | A1* | 1/2005 | Sahlgren | G02B 6/02133 385/37 |
| 2006/0133728 | A1* | 6/2006 | Biyikli | G02B 6/02152 385/37 |
| 2014/0204436 | A1* | 7/2014 | Li | G03H 1/0236 359/3 |
| 2015/0160409 | A1 | 6/2015 | Lai et al. | |
| 2017/0001898 | A1* | 1/2017 | Ortner | C03B 18/04 |

OTHER PUBLICATIONS

Lindner et al. "Tailored Draw Tower Fiber Bragg Gratings for Various Sensing Applications," Third Asia Pacific Optical Sensors Conference, SPIE, vol. 8351, No. 1. Jan. 31, 2012, pp. 1-7.
Extended European Search Report for EP Application No. 16206162.6, dated May 24, 2017.
International Search Report for Application No. PCT/EP2017/083189, dated Feb. 21, 2018.
Askins et al., "Contiguous Fiber Bragg Grating Arrays Produced On-Line During Aber Draw," Proceedings of SPIE, Smart Structures and Materials 1994: Smart Sensing, Processing, and Instrumentation, vol. 2191, May 1, 1994, pp. 80-85.
Office Communication from corresponding European Application No. 17835640.8, dated Apr. 5, 2022.

* cited by examiner

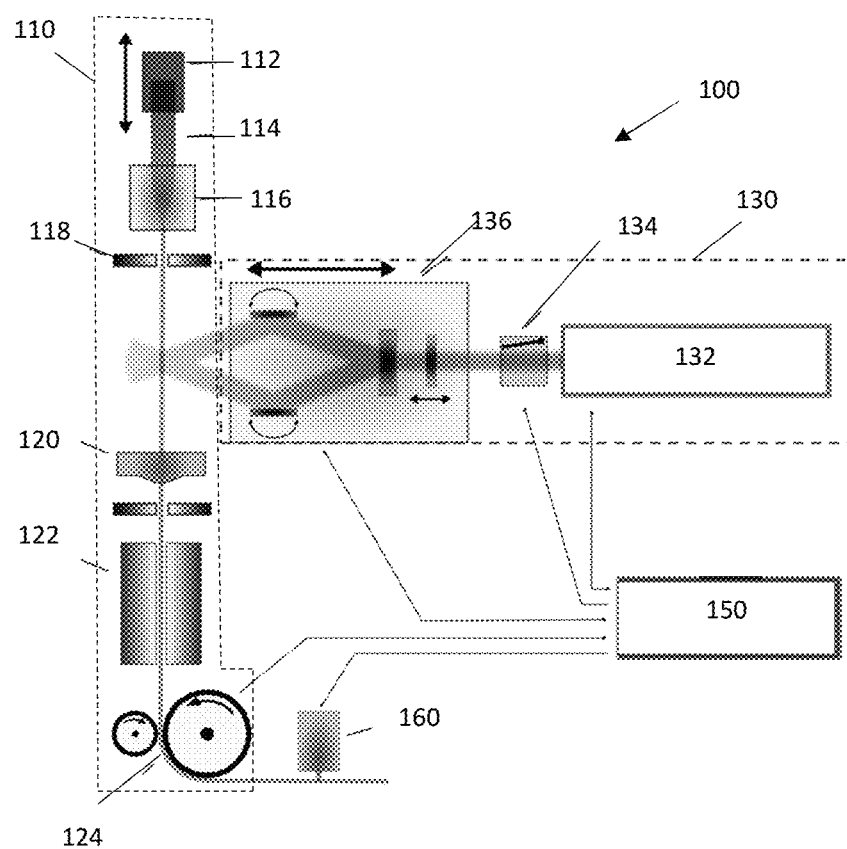

DRAW TOWER GRATING PRODUCTION METHOD AND SYSTEM

FIELD OF THE INVENTION

The invention relates to the field of methods and systems for producing optical fibers. More particularly, the present invention relates to methods and systems for producing optical fibers having an inscribed grating array by writing the grating in the fiber during the production process of the fiber itself, the method also being referred to as draw tower grating (DTG) process.

BACKGROUND OF THE INVENTION

Draw Tower Gratings are produced using a process that combines the drawing of the optical fiber with the writing of the grating. The production process has as an input a glass pre-form. After heating the pre-form, the pulling and formation of the fiber will be initiated. Further in the production process, the fiber crosses the optical axis of a laser and the interferometer that create a periodical interference pattern in order to write the grating. When the grating has been written the fiber is coated by entering a coating reservoir, followed by a-curing step of the coating. Finally the location of the FBG is marked automatically and the fiber is reeled onto a drum. This process of simultaneously drawing the fiber, writing the grating and coating the fiber directly after the grating inscription, results in high strength grating chains. As such the commonly used stripping and recoating process of standard FBGs is not necessary and the pristine fiber strength is maintained during the DTG manufacturing process. Although good fibers can be obtained, the stability of the fiber drawing process may influence the accuracy by which the gratings are written. Consequently, there is still room for improving the process.

SUMMARY OF THE INVENTION

It is an object of the present invention to provide accurate methods and system for producing fibers with an inscribed grating array.

It is an advantage of embodiments of the present invention that efficient methods and systems are provided for producing fibers with an inscribed grating array.

It is an advantage of embodiments of the present invention that methods and systems are provided that allow to produce optical fibers with well-defined fiber Bragg grating array configurations, e.g. in terms of distances between the fiber Bragg gratings and the wavelengths for which the fiber Bragg gratings are to be used.

The object is obtained by embodiments of the present invention.

The present invention relates to a system for producing an optical fiber with an inscribed grating array, the system comprising
 a fiber drawing apparatus for drawing an optical fiber,
 a writing system comprising a coherent radiation source and a radiation modulating means, configured for inscribing a grating array in the optical fiber during the drawing process of the optical fiber, and
 a controller for controlling the driving of the writing system.

The fiber drawing apparatus may comprise a material infeed and a heating means for heating the material.

The system further is characterized in that the fiber drawing apparatus comprises a fiber length and/or drawing detecting means for determining the length of the fiber and/or the drawing process, e.g. a drawing speed or another parameter characterizing the drawing process, and in that the controller is configured, e.g. programmed, for capturing information from the fiber length and/or drawing detecting means and for controlling the writing system based on the captured information captured from the fiber length and/or drawing detecting means.

It is to be noted that where reference is made to a controller, this encompasses a solution where there is a single controller that handles one or more parts of a laser of a writing system, a marking system, a shutter and/or a fiber length and/or drawing detecting means. The controller also may have other functions, known to the person skilled in the art. Alternatively, where reference is made to a controller this also encompasses the situation wherein a plurality of controllers is used for controlling one or a number of tasks, and whereby the controller refers to the plurality of controllers.

The system may, in some embodiments, be configured for inscribing a grating using a single laser pulse or using a pulse train that is generated such that the pulses in the pulse train lie sufficiently close together such that the fiber can be considered to be static with respect to the single laser pulse or pulse train. The time difference between two pulses of the pulse train, for example the difference between the first pulse and the last pulse of the pulse train or for example the difference between two subsequent pulses of the pulse train, may be such that the fiber has moved less than 50%, preferably no more than 40%, preferably no more than 30%, preferably no more than 20%, preferably no more than 10%, preferably no more than 5%, preferably no more than 1%, of the distance between subsequent two fringes of the grating written. In embodiments wherein the grating is such that the distance between fringes of the grating is not constant (e.g. for chirped gratings), the time difference between two pulses of the pulse train, for example between the first pulse and the last pulse of the pulse train or for example between two subsequent pulses of the pulse train, may be such that the fiber has moved less than 50%, preferably no more than 40%, preferably no more than 30%, preferably no more than 20%, preferably no more than 10%, preferably no more than 5%, preferably no more than 1%, of the largest distance between two subsequent fringes of the grating written.

The system may, in some embodiments, be configured for using a phase mask for the inscription process. The system may, in some embodiments, be configured for using a laser frequency lower than 500 Hz, e.g. lower than 250 Hz, e.g. lower than 100 Hz.

Embodiments of the present invention encompass both methods and systems wherein inscription is performed prior to the application of a coating layer as well as methods and systems wherein inscription is performed through the coating layer, e.g. using femtosecond laser inscription.

It is an advantage of embodiments of the present invention that for inscribing the grating array, the actual fiber length and drawing speed can be taken into account, based on information obtained using the fiber length and/or drawing detecting means. In this way, extremely accurate grating array configurations can be inscribed in the fiber. It is an advantage of embodiments of the present invention that accurate inscription of fiber Bragg gratings can be performed resulting in accurate spatial position of the fiber Bragg gratings and accurate specific wavelengths for which the fiber Bragg gratings are to be used.

It is an advantage of embodiments of the present invention that the time flow of the inscription process is controlled by the information from the fiber length and/or drawing detecting means.

In one embodiment, capturing information from the fiber length and/or drawing detecting means and controlling the writing system based on the captured information corresponds with capturing information regarding the drawing process, e.g. capturing information regarding the speed of the drawing process, and if the information corresponds with predetermined conditions, initiating the inscription process of the grating arrays. The fiber length and/or drawing detecting means is then used only before the inscription process, i.e. to check whether the system is within predetermined conditions The fiber length and/or drawing detecting means may comprise a rotating means for guiding the drawn fiber in a non-slipping mode. It is an advantage of embodiments of the present invention that an easy mechanical component can be used for accurately determining the length of the fiber and/or speed of the fiber drawing process and/or other parameter characterizing, in part or fully, the fiber drawing process. The fiber length and/or drawing detecting means may be a capstan.

The fiber length and/or drawing detecting means may comprise a recording device for recording a position and/or speed of the rotating means, said information from the fiber length and/or drawing detecting means being based on the position and/or speed of the rotating means. It is an advantage of embodiments of the present invention that position information and/or speed information of the rotating means can be used for determining a length of the drawn fiber, and/or a speed of the drawing process and/or for determining another characteristic of the drawing process, e.g. if the drawing process is running within predetermined standards.

The fiber length and/or drawing detecting means may comprise a speed detection means for recording a speed of the drawing process. The speed detection means may for example be a Doppler based speed detection means. It is an advantage of at least some embodiments of the present invention that the information from the fiber length and/or drawing detecting means may be more accurate based on speed information compared to a fiber length and/or drawing detecting means based on position information. It is an advantage of at least some embodiments of the present invention that the resolution of the obtained information may be better than a measurement based on the typical length of the circumference of the rotating means.

The controller may be configured, e.g. programmed, for dynamically controlling the writing system during the drawing of a same fiber. Dynamically controlling may be a continuous controlling or in between inscriptions. It is an advantage of at least some embodiments of the present invention that changes in the drawing process occurring during the drawing process can be taken into account or compensated for. Alternatively, controlling the writing system may comprise controlling the writing system prior to the first writing process of a fiber.

The controller may be configured, e.g. programmed, for continuously controlling the writing system during the drawing of a same fiber. It is an advantage of at least some embodiments of the present invention that changes in the drawing process can be substantially instantaneously be taken into account in the writing process.

In some embodiments, the controller may be configured, e.g. programmed, for continuously controlling the writing system, e.g. for continuously controlling a Talbot interferometer so as to change the wavelengths of the gratings in the grating array.

The controller may be configured, e.g. programmed, for controlling the writing system in between inscription processes in the same fiber. It is an advantage of some embodiments of the present invention that the writing system is only altered during moments that the inscription is not applied.

The coherent radiation source may be a laser and the controller for controlling the writing system, may be configured, e.g. programmed, for selecting and/or tuning a particular laser repetition rate. The controller may be configured, e.g. programmed, for selecting a repetition rate. In some embodiments the selecting of a repetition rate may be selecting between a higher repetition rate and a lower laser repetition rate, based on the information from the fiber length and/or drawing detecting means. Alternatively, the repetition rate can also be controlled continuously or stepwise between a plurality of rates, based on the information from the fiber length and/or drawing detecting means.

The writing system may comprise a shutter for controlling selection of irradiation pulses generated by the coherent radiation source and the controller may be configured, e.g. programmed, for controlling the writing system by controlling the pulse selection from the irradiation pulses, based on the information from the fiber length and/or drawing detecting means.

The coherent radiation source may be a laser and the controller may be, for controlling the writing system, configured, e.g. programmed, for selecting and/or tuning a laser parameter. In some embodiments, the laser parameter may be a laser frequency, also referred to as laser repetition rate.

It is an advantage of some embodiments of the present invention that operation can be performed at a high laser repetition rate, by selecting only those pulses of interest to be used for the inscription process.

According to some embodiments of the present invention, the controlling of the writing system may be selecting and/or tuning the laser frequency for tuning the spacing between the gratings of a grating array. Varying the laser frequency allows selecting the distance between gratings of a grating array from a continuous range.

The controller may be configured, e.g. programmed, for controlling the optical system by controlling the radiation modulation means during the fiber drawing process. The radiation modulation means may be an interferometer, such as for example a Talbot interferometer, although embodiments are not limited thereto. In some embodiments, the radiation modulation means may for example be a phase inducing means such as for example a system based on a phase mask.

The controller may be configured, e.g. programmed, for dynamically controlling the radiation modulation means during the fiber inscription process. It is an advantage of embodiments that correct radiation modulation can be used, such as for example correct interferograms can be used.

Controlling the radiation modulation means may be adjusting the radiation modulation means to induce an inscription process at a desired Bragg wavelength. It is an advantage of embodiments of the present invention that the Talbot interferometer components are continuously in motion, the system suffers less from errors induced by stopping mechanical components.

The system furthermore may comprise a marking system and the controller may be configured, e.g. programmed, for controlling the marking system for providing marking on the fiber based on the information from the fiber length and/or drawing detecting means. The marking system may be an optical marking system, a mechanical marking system, etc. It may be configured for marking by contacting the fiber or it may be a contactless marking system. The marking system may be based on a printing principle, such as for example providing marking through an inkjet principle. The marking system may comprise a laser source for laser marking on the fiber.

The controller and the marking system may be configured for determining a position of the marking on the fiber, as function of the information obtained from the fiber length and/or drawing detecting means. It is an advantage of at least some embodiments of the present invention that the marking on the fiber can be positioned outside a region where the grating has been inscribed. It is an advantage of at least some embodiments of the present invention that the marking can be performed at predetermined positions with respect to the positions where the grating has been inscribed, such that the marking can be used as an identification of a position where the grating has been inscribed. The marking can also be used as an identification of a position where a new fiber section starts.

The present invention also relates to a method for producing an optical fiber with inscribed grating array, the method comprising drawing a fiber, inscribing a grating array in the optical fiber during the drawing process of the optical fiber, characterized in that during said drawing, the method comprises capturing information regarding the length of the fiber and/or the drawing speed and/or the drawing process and controlling the writing based on the captured information.

The present invention furthermore relates to a controller for controlling a fiber drawing process for grating array inscribed fibers, the controller being configured, e.g. programmed, for capturing information regarding the length of the fiber and/or the drawing speed and/or the drawing process and controlling the writing based on the captured information.

The present invention also relates to a computer program product that, when executing on a processor, implements a method as described above. The present invention furthermore relates to a data carrier storing a computer program product as described above, as well as to the transmission of such a computer program product over a network.

The present invention also relates to an optical fiber with an inscribed grating array manufactured using a method as described above.

The present invention furthermore relates to a system for producing an optical fiber with an inscribed grating array, the system comprising a fiber drawing apparatus for drawing an optical fiber, the fiber drawing apparatus, a writing system comprising a coherent radiation source and a radiation modulating means, configured for inscribing a grating array in the optical fiber during the drawing process of the optical fiber, and a controller for controlling the driving of the writing system.

The system further is characterized in that the radiation modulating means is a Talbot interferometer and in that the mirrors and/or the translation stage of the Talbot interferometer are continuously in motion during the drawing process. The latter results in the advantage that no sudden changes in movement of the Talbot interferometer components are required when the Talbot interferometer needs to be adjusted for writing at another Bragg wavelength, thus resulting in a more fluent and accurate process.

The fiber drawing apparatus may comprise a material infeed and a heating means for heating the material.

The continuous motion, e.g. rotation, of the mirrors of the Talbot interferometer and/or the movement of the translation stage may at least partly cover the need for adjustment of the writing process as function of information obtained from a fiber length and drawing detecting means, as described in other aspects of the present invention, the continuous motion may be induced partly of the need for adjusting the Bragg wavelength for inscribing a grating at another Bragg wavelength.

The continuous motion may be a rotation of the mirrors of the Talbot interferometer and/or movement over the translation stage.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 illustrates a schematic overview of a system for drawing a fiber with inscribed grating array, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Where in embodiments of the present invention reference is made to the drawings speed or the fiber drawing speed or the speed of the drawing process or the speed of the fiber, reference is made to the speed at which the fiber is drawn. If this speed is not as predetermined, this influences the correctness of the positions of the fiber Bragg gratings introduced and possibly also the correctness of the wavelengths of the fiber Bragg gratings introduced. In embodiments of the present invention, variations of the speed are taken into account.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a system for producing an optical fiber with an inscribed grating array, e.g. a fiber Bragg grating array. The system according to embodiments of the present invention may be referred to as the draw tower grating process, whereby the inscription of the grating array, e.g. fiber Bragg grating array, occurs during the drawing process. In some embodiments, the inscription occurs prior to application of the fiber coating. Alternatively, methods and systems according to embodiments of the present invention also may relate to inscription of gratings that occurs through the fiber coating. One known technique to obtain such inscription through the fiber coating is by implementing a femtosecond laser. The array of gratings may be an array of identical gratings, but also may be an array of different gratings, whereby both the grating design as well as the distance between the gratings may vary. The system according to embodiments of the present invention typically comprises a fiber drawing apparatus for drawing an optical fiber. Such a fiber drawing apparatus typically may comprise a material infeed system for feeding material from which the fiber is to be drawn into the system. Such material also may be referred to as the preform. The system also typically may comprise a heating means for heating the preform material. It may comprise a means for monitoring the diameter of the fiber, or more particularly of the fiber drawn from the preform material, prior to the fiber being inscribed. The system also comprises a writing system comprising a coherent radiation source, e.g. a laser, and a radiation modulating means, configured for inscribing a grating array in the optical fiber during the drawing process of the optical fiber and prior to the optical fiber being coated.

The system furthermore comprises a controller for controlling the writing system. According to the present invention, the fiber drawing apparatus also comprises a fiber length and/or drawing detecting means for controlling the position of the fiber or the drawing speed of the fiber during the drawing process. Such a fiber length and/or drawing detecting means may for example measure the position or rotation speed of a capstan, although embodiments are not limited thereto. The fiber length and/or drawing detecting means may for example be positioned downstream the position where the grating array is inscribed and where the coating is applied. The system furthermore is configured for capturing information from the fiber length and/or drawing detecting means, the information being representative for properties or a status of the drawing process and/or for determining the actual length of the fiber. Properties or a status of the drawing process may include for example a drawing speed. The system furthermore comprises controlling the writing system, e.g. the coherent radiation source and/or the radiation modulating means, based on the captured information.

By way of illustration, embodiments of the present invention not being restricted thereto, an exemplary draw tower grating system will further be discussed with reference to FIG. 1, illustrating standard and optional features of such a system.

FIG. 1 illustrates a draw tower grating system 100 for drawing a fiber with inscribed grating, e.g. fiber Bragg grating. The system 100 comprises a fiber drawing apparatus 110. The exemplary system comprises a material feed 112 configured for feeding material, also referred to as the preform. The preform input may be selected so as to have a predetermined diameter or to be within a predetermined diameter range, such that in combination with the appropriate heating process, a fiber of the appropriate dimensions can be produced. The preform, shown as item 114, typically may be transferred to a heating means 116 for heating the preform such that from the heated material a fiber can be drawn. The heating means 116 may be an oven. The system furthermore typically may comprise a system for monitoring 118 the diameter of the fiber prior to the fiber being inscribed. The system for monitoring 118 may for example allow to adjust the heating and or drawing parameters, based on the monitored fiber diameter. The system for monitoring 118 may comprise a detector for detecting the diameter of the fiber. The detectors may be optical detectors, although embodiments are not limited thereto.

Downstream the system for monitoring 118, the fiber being drawn in some embodiments may be first inscribed. Therefore a writing system is used, which will be discussed in more detail later. After inscription, typically a protective coating is applied. The fiber drawing apparatus 110 therefore furthermore typically may comprise a coating means 120 for coating the fiber after it has been inscribed. The coating means 120 therefore is positioned downstream the area where the inscription occurs.

Alternatively in some embodiments the fiber coating may be applied first and inscription of the fiber grating may be applied afterwards, i.e. through the fiber coating. The latter may for example be performed using a femto-laser system, as known by the person skilled in the art.

The fiber drawing apparatus furthermore may comprise a curing means 122 for curing the coating of the fiber. Such a curing means 122 may be a UV curing means or a heater for curing via heating.

According embodiments of the present invention, the system comprises a fiber length and/or drawing detecting means 124 for detecting a fiber length, and/or a drawing speed, or another characteristic or status of the drawing process. The fiber length and/or drawing detecting means 124 may for example be a rotating means where the drawn fiber is guided in a non-slipping mode. In some embodiments the fiber length and/or drawing detecting means 124 may comprise a rotation counting means for detecting how many rotations or fractions thereof are performed by the rotating means. The rotating means may be a capstan. Information of the length of the fiber may thus be based on a number of revolutions of the rotation means or capstan.

Alternatively or in addition thereto a speed of the fiber drawing may be determined and the fiber length and/or drawing detecting means may comprise a speed detection means for determining a speed of the fiber drawing. Examples of speed detection means may for example be a Doppler detector, although embodiments are not limited thereto.

The information that may be obtained thus may be a length of the fiber or information being equivalent therewith such as positions on the fiber, a speed of the fiber, a status of the drawing process such as the drawing process being within predetermined operating conditions, other characteristics of the drawing process, such as for example the weight of the preform. Such information may thus be captured by the fiber length and/or drawing detecting means and transferred to a controller 150 controlling one or more of the writing process, a marking system, etc. Alternatively, the fiber length and/or drawing detecting means may also function itself as a controller 150 for controlling the writing process, a marking system, etc.

The fiber drawing apparatus typically also may comprise a winding system for winding the fiber so it can be stored or transported.

Besides the fiber drawing apparatus 110, the system also comprises a writing system 130 for writing a grating in the fiber.

The writing system 130 typically may comprise a coherent radiation source 132, such as for example a laser, a shutter unit 134 for controlling whether or not a laser pulse is used for writing the grating and a radiation modulating means 136. The laser used may be any suitable laser such as for example a KrF-Excimer laser. The laser may be setup on top of the tower, so vibrations of the draw tower do not exert influence ion the laser beam positioning and stability. The other components such as the shutter unit 134 and the radiation modulating means 136 or parts thereof such as the interferometer itself may be fixed at the tower structure. The shutter may be a mechanical shutter, such as for example a computer controlled mechanical shutter, for controlling the number of laser pulses that is used for the FBG inscription process.

As indicated above the system typically also comprises a controller 150. Such a controller 150 may be configured, e.g. programmed, for controlling the writing system 130, the fiber length and/or drawing detecting means 124, the marking system 160, etc. The controller 150 may be a single controller combining different controlling tasks or it may be a combination of different sub-controllers each performing one or more functions or being dedicated to a specific function. With respect to the writing system 130, the controller 150 may be configured, e.g. programmed, for controlling the coherent radiation source 132, e.g. a repetition rate, for controlling a shutter unit 134 and/or for controlling the mirrors and/or translation stages of the radiation modulating means 136, e.g. when the radiation modulating means 136 is an interferometer such as a Talbot interferometer. The controlling may be such that the mirror rotations and the movement of the translation stages is synchronized, although embodiments are not limited thereto.

The radiation modulating means 136 may for example be an interferometer, such as for example a Talbot interferometer, although embodiments of the present invention are not limited thereto.

In a particular embodiment, the radiation modulating means is a Talbot interferometer, whereby the mirrors and/or the translation stage of the Talbot interferometer are continuously in motion during the drawing process. The latter results in the advantage that no sudden changes in movement of the Talbot interferometer components are required when the Talbot interferometer needs to be adjusted for writing at another Bragg wavelength, thus resulting in a more fluent and accurate process. The continuous motion may be a rotation of the mirrors of the Talbot interferometer and/or movement over the translation stage.

The system also comprises a marking system 160 for providing marking on the drawn fiber. The marking system 160 may be a mechanical or optical marking means, providing for example grooves, ink indications, lasered features, etc. for indicating a position or length of the drawn fiber, a position of the next fiber grating in the grating array, etc. As indicated above, the marking system 10 may use information from the fiber length and/or drawing detecting means 124, thus using accurate fiber length, fiber speed or other parameter information.

In a second aspect, the present invention relates to a method for producing an optical fiber with inscribed grating array, the method comprising drawing an optical fiber. The method also comprises inscribing a grating array in the optical fiber during the drawing process of the optical fiber. According to embodiments of the present invention, the method also is characterized in that, during said drawing, the method comprises capturing information regarding the length of the fiber and/or the drawing speed and/or the drawing process and controlling the writing based on the captured information. Further method steps may correspond with the functionality of the features of the system as described in the first aspect.

In another aspect, the present invention furthermore relates to a controller for controlling a fiber drawing process for grating array inscribed fibers, the controller being configured, e.g. programmed, for capturing information regarding the length of the fiber and/or the drawing speed and/or the drawing process and controlling the writing based on the captured information. The controller furthermore may optionally have the functionality as described in the first aspect.

The present invention also relates to a computer program product that, when executing on a processor, implements a method as described above. The present invention furthermore relates to a data carrier storing a computer program product as described above, as well as to the transmission of such a computer program product over a network.

The present invention also relates to an optical fiber with an inscribed grating array manufactured using a method as described above.

In yet another aspect, the present invention furthermore relates to a system for producing an optical fiber with an inscribed grating array, the system comprising
- a fiber drawing apparatus for drawing an optical fiber, the fiber drawing apparatus,
- a writing system comprising a coherent radiation source and a radiation modulating means, configured for inscribing a grating array in the optical fiber during the drawing process of the optical fiber, and
- a controller for controlling the driving of the writing system.

The system further is characterized in that the radiation modulating means is a Talbot interferometer and in that the mirrors and/or the translation stage of the Talbot interferometer are continuously in motion during the drawing process. The latter results in the advantage that no sudden changes in movement of the Talbot interferometer components are required when the Talbot interferometer needs to be adjusted for writing at another Bragg wavelength, thus resulting in a more fluent and accurate process. The continuous motion, e.g. rotation, of the mirrors of the Talbot interferometer and/or the movement of the translation stage may correspond with or be a substantial part of the adjustment of the writing process as function of information obtained from the fiber length and drawing detecting means, as described in other aspects of the present invention, the continuous motion may be induced partly of the need for adjusting the Bragg wavelength for describing a grating at another Bragg wavelength.

The continuous motion may be a rotation of the mirrors of the Talbot interferometer and/or movement over the translation stage. Further features and characteristics may be as described in the first aspect of the present invention.

In still another aspect, the present invention relates to a system for producing an optical fiber with an inscribed grating or grating array, the system comprising a fiber drawing apparatus for drawing an optical fiber, a writing system comprising a coherent radiation source and a radiation modulating means, configured for inscribing a grating in the optical fiber during the drawing process of the optical fiber, and a controller for controlling the driving of the writing system. The system is characterized in that it is configured for inscribing a grating using a pulse train that is generated such that the pulses in the pulse train lie sufficiently close together such that the fiber can be considered static with respect to the pulse train. The different pulses of the pulse train thus advantageously are positioned sufficiently close together such that only one grating will be created by the pulse train.

The time difference between two pulses of the pulse train, for example the difference between the first pulse and the last pulse of the pulse train or for example the difference between two subsequent pulses of the pulse train, may be such that the fiber has moved less than 50%, preferably no more than 40%, preferably no more than 30%, preferably no more than 20%, preferably no more than 10%, preferably no more than 5%, preferably no more than 1%, of the distance between subsequent two fringes of the grating written. In embodiments wherein the grating is such that the distance between fringes of the grating is not constant (e.g. for chirped gratings), the time difference between two pulses of the pulse train, for example between the first pulse and the last pulse of the pulse train or for example between two subsequent pulses of the pulse train, may be such that the fiber has moved less than 50%, preferably no more than 40%, preferably no more than 30%, preferably no more than 20%, preferably no more than 10%, preferably no more than 5%, preferably no more than 1%, of the largest distance between two subsequent fringes of the grating written.

It is an advantage of embodiments of the present invention that the total energy used to inscribe the grating can be increased, while the energy density of the individual pulses of the pulse train can be limited compared to the situation where this energy would be in a single pulse. In this way, the total energy used to write a grating can be increased while the energy density can be restricted such that the inscribed grating may have a higher reflectivity and remains a type I grating, rather than a type II grating, i.e. than a damage written grating.

The pulse train may exist of a plurality of separated pulses, although depending on the delay induced between the pulses of the pulse train, the different pulses of the pulse train also may overlap and result in a stretched pulse, rather than in a pulse train. Also in this case, the total energy used to write a grating can be increased while the energy density can be restricted such that no type II grating is induced.

Generation of the pulse train or stretched pulse can be obtained in any suitable way, such as for example by using a polarisation splitter and a polarisation convertor, allowing a first part of the laser pulse with a first predetermined polarisation to pass to the fiber, redirecting the remaining part of the laser pulse having another polarisation and thereafter altering the polarization of the remaining part of the laser pulse to the first predetermined polarization and allowing the remaining part to pass to the fiber. An alternative way for converting a laser pulse into a pulse train, may be by using an optical cavity with a semi-transparent mirror, thus converting a laser pulse into a pulse train whereby each pulse of the pulse train has an energy being e.g. 30% of the remaining pulse energy in the cavity. The delay between the different pulses can be determined by the delay induced for the remaining part of the pulse, but is in anyway selected such that the drawn fiber can be considered static with respect to the overall pulse train or stretched pulse. Typically, since the above principle results theoretically in a pulse train of an infinite length, the length of the pulse train should be limited, e.g. by using a shutter. Further features and characteristics may be as described in the first aspect of the present invention.

The present invention also relates to a corresponding method and to a computer program product that, when executing on a processor, implements a method as described above. The present invention also relates to an optical fiber with an inscribed grating or grating array manufactured using a method as described above.

The invention claimed is:

1. A system for producing an optical fiber with inscribed grating, the system comprising:
   a fiber drawing apparatus arranged for drawing an optical fiber;
   a writing system comprising:
      a coherent radiation source and
      a radiation modulating means, configured for inscribing a grating in the optical fiber during a drawing process of the optical fiber; and
   a controller configured for controlling the writing system;
   wherein the fiber drawing apparatus comprises a fiber length and/or drawing detecting means for determining a fiber length and/or a fiber drawing speed and/or a fiber drawing parameter during the drawing process, and
   the controller being configured for capturing information from the fiber length and/or drawing detecting means and for controlling the writing system based on the captured information captured from the fiber length and/or drawing detecting means.

2. The system according to claim 1, wherein the fiber length and/or drawing detecting means comprises a rotating means for guiding the optical fiber in a non-slipping mode.

3. The system according to claim 2, wherein the fiber length and/or drawing detecting means comprises a recording device for recording a position of the rotating means, said information from the fiber length and/or drawing detecting means being based on the position and/or speed of the rotating means.

4. The system according to claim 1, wherein the fiber length and/or drawing detecting means comprises a speed detection means for recording a speed of the drawing process.

5. The system according to claim 1, wherein the controller is configured for controlling the writing system during the drawing so as to fine tune the position and/or a wavelength of a fiber Bragg grating in a fiber Bragg grating array to be inscribed in the optical fiber.

6. The system according to claim 5, wherein the controller is configured for continuously controlling the writing system during the drawing of a same fiber.

7. The system according to claim 5, wherein the controller is configured for controlling the writing system in between inscription processes in a same fiber.

8. The system according to claim 1, wherein the controller is configured for dynamically controlling the writing system during the drawing of a same fiber.

9. A system for producing an optical fiber with inscribed gratings, the system comprising:
   a fiber drawing apparatus arranged for drawing an optical fiber,
   a writing system comprising:
      a coherent radiation source, wherein the coherent radiation source is a laser, and
      a radiation modulating means, configured for inscribing a grating in the optical fiber during a drawing process of the optical fiber, and
   a controller configured for controlling the writing system,
   wherein the fiber drawing apparatus comprises a fiber length and/or drawing detecting means for determining a fiber length and/or a fiber drawing speed and/or a fiber drawing parameter during the drawing process, and
   the controller being configured for capturing information from the fiber length and/or drawing detecting means and, for said controlling the writing system, configured for selecting and/or tuning a frequency of the laser based on the captured information captured from the fiber length and/or drawing detecting means.

10. The system according to claim 9, wherein the writing system comprises a shutter for controlling selection of irradiation pulses generated by the coherent radiation source and
    wherein the controller is configured for controlling the writing system by controlling the selection of the irradiation pulses, based on the information from the fiber length and/or drawing detecting means.

11. The system according to claim 9, wherein the controller is configured for controlling the writing system by controlling the radiation modulation means during the fiber drawing process.

12. The system according to claim 11, wherein the controller is configured for dynamically controlling the radiation modulation means during the fiber drawing process.

13. The system according to claim 12, wherein said dynamically controlling is continuous controlling or controlling in between inscriptions.

14. The system according to claim 9, wherein the writings system comprises a Talbot interferometer and wherein said controlling of the writing system comprises adjusting the Talbot interferometer to a desired Bragg wavelength.

15. The system according to claim 9, wherein the system furthermore comprises a marking system for providing marking on the optical fiber based on the information from the fiber length and/or drawing detecting means, and
    wherein said controller is configured for controlling the marking system.

16. The system according to claim 9, wherein the system furthermore comprises a marking system.

17. The system according to claim 16, wherein the marking system is configured for determining a position of the grating on the fiber.

18. The system according to claim 9, wherein the writing system is configured for inscribing a grating using a pulse train that is generated such that the pulses in the pulse train lie sufficiently close together such that the fiber can be considered static with respect to the pulse train.

* * * * *